Oct. 8, 1929.  C. E. FITCH  1,730,926
MACHINE FOR MAKING VACUUM TUBES
Original Filed Oct. 30, 1925   3 Sheets-Sheet 1
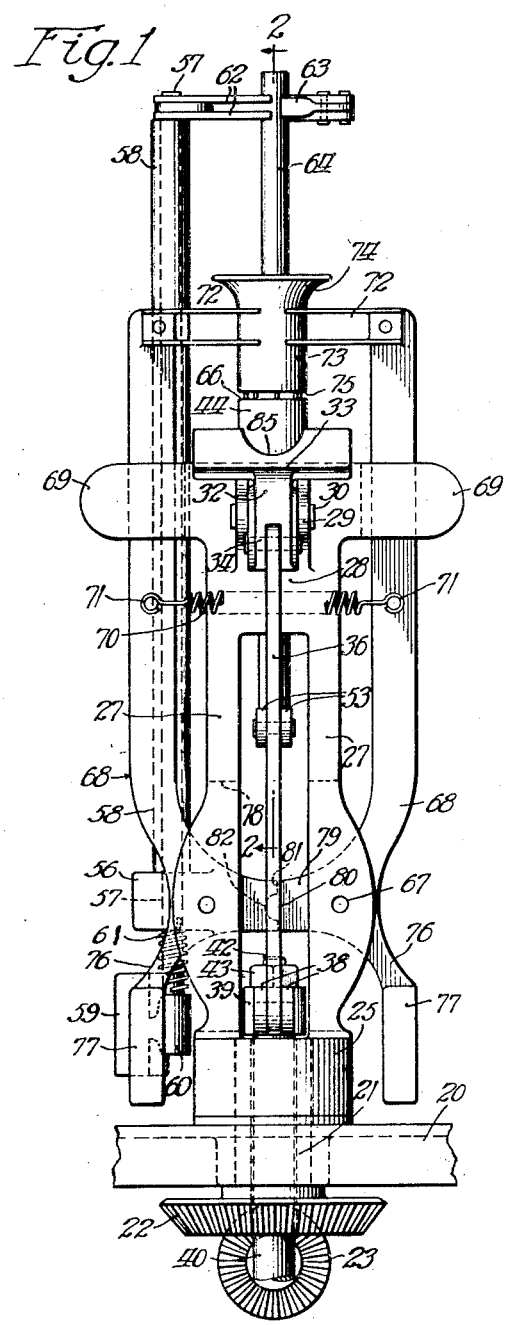
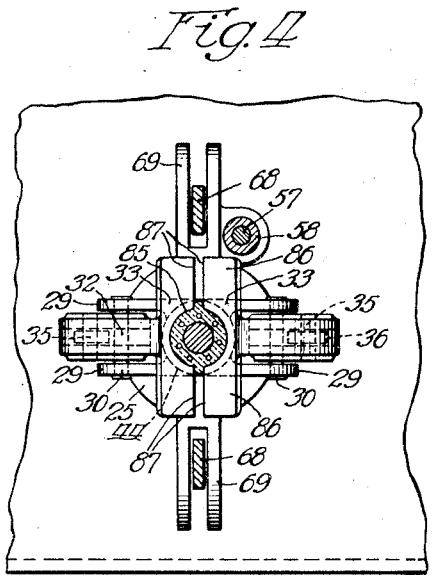
Inventor
Claude E. Fitch

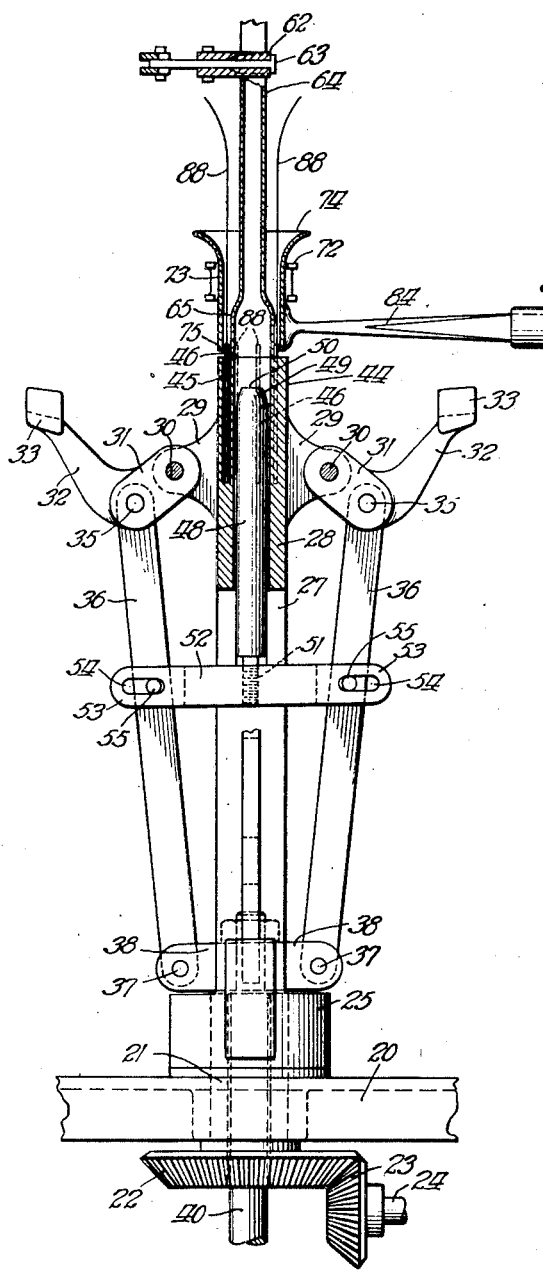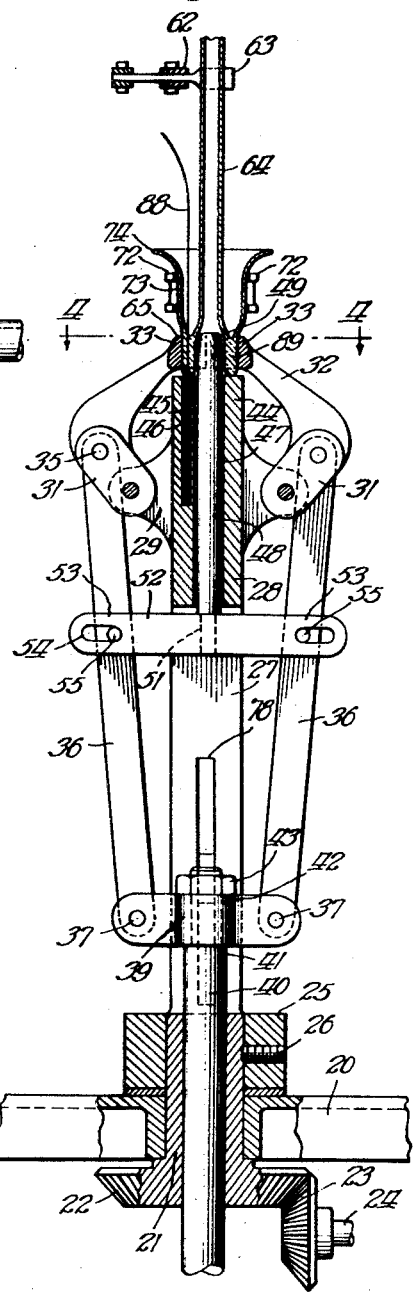

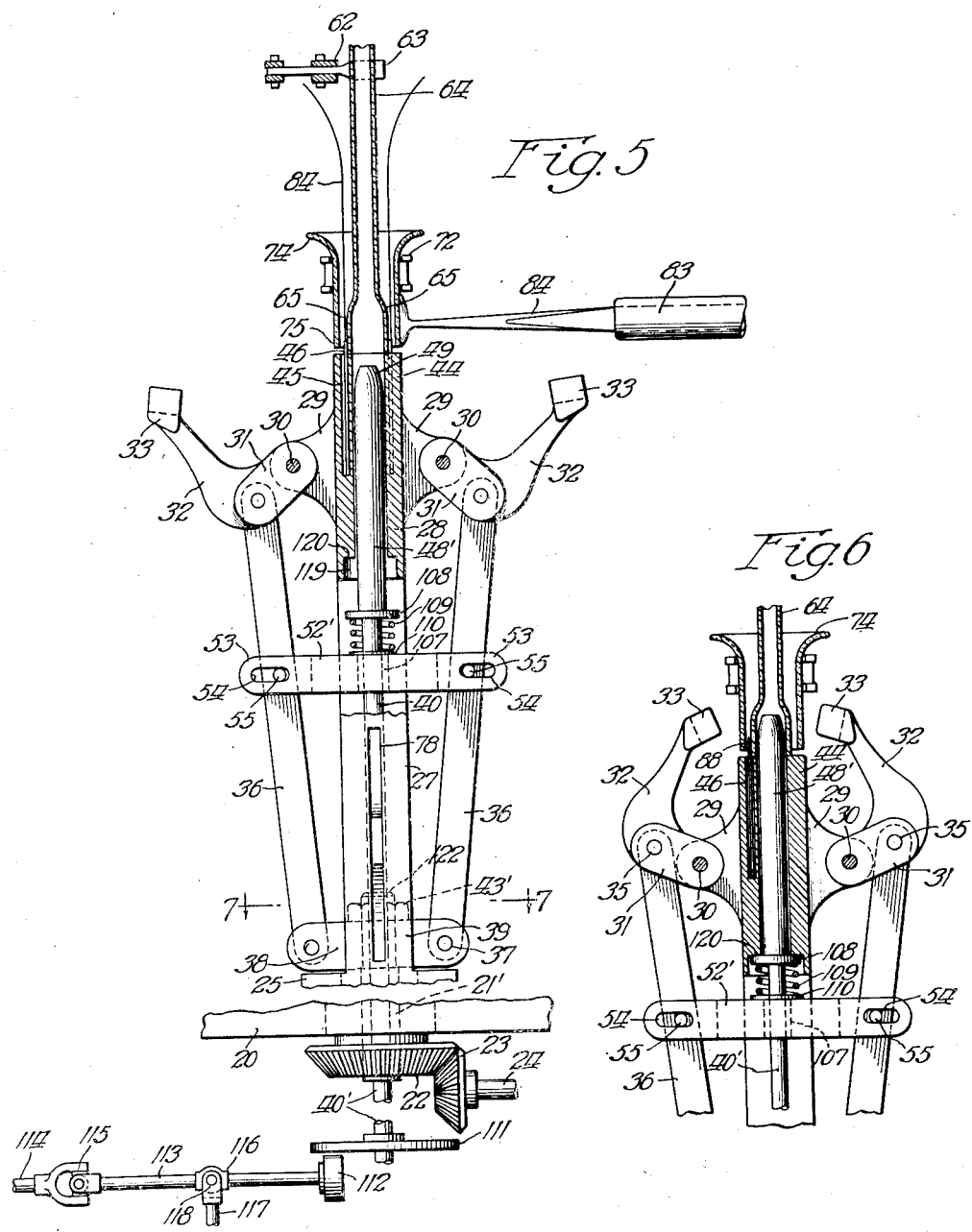

Patented Oct. 8, 1929

1,730,926

UNITED STATES PATENT OFFICE

CLAUDE E. FITCH, OF WILMETTE, ILLINOIS

MACHINE FOR MAKING VACUUM TUBES

Original application filed October 30, 1925, Serial No. 65,774. Divided and this application filed October 17, 1927. Serial No. 226,718.

My invention relates to a machine for making certain mounting portions of vacuum tubes, incandescent light bulbs and the like.

This application is a division of my copending application, Serial Number 65,774, filed October 30, 1925, for vacuum tube and method of making the same.

It is a purpose of my invention to provide a machine for making a stem unit for vacuum tubes and the like, with an exhaust passage therein, comprising means for supporting a tubular member through which the exhaust passage extends and a tubular member of larger diameter forming the stem portion in embracing relation to the first mentioned tubular member; to provide means for supporting a plurality of wires in predetermined spaced relation between said tubular members and to provide a core insertable within the inner tubular member cooperating with a pair of jaws engaging the outer tubular member so as to compress said tubular members between said core and said jaws while heated to a plastic condition to firmly unite said members and seal the wires therein.

The core is preferably of such a size that the same expands the inner tubular member toward the outer tubular member and the jaws engaging the outer tubular member are preferably curved so as to provide a pair of substantially semicylindrical faces engaging the outer tubular member while the inner tubular member is of a cylindrical form with a tapering end portion. The inner tubular member is preferably provided with a widened end that receives the core and in order to prevent the decrease in diameter of this member when heated to a plastic state, it is sometimes desirable to insert a rotating core or mandrel within said member before the jaws engage the outer member to compress the same and unite the same with the inner tubular member.

It is accordingly a purpose of the invention to provide a core member that may be projected into the inner tubular member as the jaws are moving toward each other into compressing position and to provide means for moving said core into said inner tubular member and simultaneously rotating the same, said movement being independent of the movement of the jaws.

It is also a purpose of the invention to provide a core member projectable into the inner tubular member movable with the jaw members as the same move toward each other that is provided with means for limiting the movement of said core member so as to halt the same before the jaw members engage with the outer tubular member to compress the same.

As the supporting means for the tubular members rotates and the jaws and the supporting means form part of a rotating head, the core member may either be rotated in such a manner as to rotate relatively to the other rotating parts or may be held stationary which will produce the effect of a relative rotation between the support and the core member to thus shape the inner tubular member and hold the same from necking in during the heating operation.

Other objects and advantages of the invention will appear as the description of the accompanying drawings proceeds. However, I desire to have it distinctively understood that I do not intend to limit myself to the exact details shown or described, but that I intend to include as part of my invention all such obvious changes and modifications of parts as would occur to a person skilled in this art and as would fall within the scope of the claims.

In the drawings:

Fig. 1 is a view in side elevation of my improved machine, certain portions thereof being partly broken away;

Fig. 2 is a view partly in section on the line 2—2 of Fig. 1; and partly in elevation looking at the same at right angles to Fig. 1;

Fig. 3 is a view similar to Fig. 2, certain parts being omitted for the sake of clearness, the parts being in a different position than in Fig. 2;

Fig. 4 is a section taken on the line 4—4 of Fig. 3;

Fig. 5 is a view similar to Fig. 2 of a different form of the invention; and

Fig. 6 is a fragmentary view partly in section and partly in elevation of the structure shown in Fig. 5 with the parts in a different position.

In Figs. 1 to 4 inclusive, one form of the machine included in my invention is shown and in this form, a base plate or member 20 is provided in which is journaled a vertically extending hollow shaft 21 which is provided with a bevelled gear 22 engaging with the bevelled gear 23 mounted on the drive shaft 24. Mounted on the shaft 21 is a rotatable head having a circular base portion 25 that is secured to the shaft 21 to rotate therewith by means of a set screw 26 or any other suitable means.

Extending upwardly from the base member 25 is a pair of side arms 27 of a vertically extending frame member which are connected adjacent their upper ends by a web portion 28. The upright frame members are further provided with a pair of ears 29 projecting laterally therefrom that are apertured to receive the pivot pins 30 upon which the links 31 are pivoted. Said links 31 are provided with upwardly extending arms 32 that terminate in jaws 33. The links 31 are further provided with bifurcated portions 34 below the fingers 32 which are apertured to receive the pivot pins 35 for pivotally connecting the elongated links 36 therewith. The links 36 are mounted so that the same diverge upwardly and are pivotally connected at 37 at their lower ends to the pivot ears 38 by means of the pivot pins 37. The pivot ears 38 are provided on a yoke member 39 which is mounted on the shaft 40 extending through the hollow shaft 21, the shaft 40 being provided with a shoulder 41 upon which the yoke member 39 rests and having a reduced portion 42 extending through the yoke member which is screw-threaded so as to receive the clamping nut 43.

The upper end of the upright frame member of the rotatable head is provided with a supporting member 44 which is provided with a plurality of openings 45 for receiving the wires 46, the openings 45 being arranged in a circular series, and the member 44 and connecting web portion 28 being provided with a longitudinal bore 47 substantially concentric with the circular series of openings 45. Mounted within the bore 47 is a rod like mandrel or core 48 substantially cylindrical except at the extreme end portion thereof which tapers on a curve as indicated at 49 and terminates in a substantially flat end portion 50. The member 48 is secured in any suitable manner as by means of the reduced screw-threaded portion 51 with a cross bar 52 having pairs of ears 53 thereon provided with the slots 54 in which operate the pins 55 provided on the links 36.

As the rod or shaft 40 is moved upwardly, the yoke 39 is carried upwardly therewith moving the links 36 from the position shown in Fig. 2 to the position shown in Fig. 3. At the same time the cross bar 52 is carried upwardly moving the core 48 upwardly until it assumes the position shown in Fig. 3.

One of the members 27 is provided with an apertured ear 56 through which passes the vertically extending rod 57 having a sleeve 58 provided thereon, the lower end of the rod 57 having a handle member 59 provided thereon that has an enlarged sleeve-like portion 60 embracing the rod 57 and secured thereto in any suitable manner. A coil or compression spring 61 is mounted between the ear 56 and the enlargement 60. On the upper end of the rod 57 is mounted a pair of jaws 62 and 63 which cooperate to hold the exhaust tube 64 of glass in a vertical position and in the proper position for cooperation with the other parts that are to be united in the machine. The lower end of the tube 64 is flared so as to increase the diameter thereof, as indicated at 65 before placing in the machine and rests on the upper surface 66 of the support 44. Thus, the support 44 acts to not only support the wires 46 in their proper relative position, but also supports the tube 64 in proper position relative thereto.

Pivotally mounted between the members 27 on the pivot pins 67 is a pair of jaws 68 which operate between the pairs of guide ears 69 extending outwardly from the members 27 and which are normally pulled toward each other by means of the spring 70 secured to the pins 71 extending outwardly from the members 68. The upper ends of the members 68 have secured thereto a pair of jaw members 72 that together embrace the stem forming member 73 and are shaped to conform to the outer surface thereof, said stem forming member being provided with an outwardly curved flared upper end 74 that rests against the top faces of the jaws 72 in such a manner that the lower end 75 of the member 73 will be slightly spaced from the surface 66 as is clearly shown in Figs. 1 and 2. The lower ends of the jaws 68 are provided with depending extensions 76 that are provided with the transverse handles 77 on the ends thereof which engage with the members 27 to limit the outward movement of the jaws 68. Slots 78 are provided in the members 27 through which the jaws 68 extend. The jaws 68 are further provided with inward extensions 79, one of which is provided with a flat face 80 and the other with flat portions 81 on opposite sides of a semi-circular recess 82 which are adapted to engage to limit the inward movement of the jaws 68.

The entire head comprising all the parts mounted on the members 21 and 40 rotates as a unit and suitable stationary nozzles, such as the nozzles 83, are provided so as to provide the gas flame 84 for heating the glass members 64 and 73, the nozzles being so placed that the lower end portions of the member 73 is heated as clearly shown in Fig. 2 by the flame playing thereagainst and the flame therefrom passes under the member 73 into engagement with the widened portion 65 of the member 64 to also heat said member.

The jaws 33 are provided with substantially semicylindrical inner faces 85 and with laterally extending wing portions 86 having flat faces 87 opposite each other. The wires 46 have borated copper clad wires 88 secured thereto in any suitable manner, certain of said wires being elongated and acting as conductors and others being short, (preferably about one-eighth inch long), and acting as sealing means and anchoring means for the wires 46, the borated copper clad wires uniting more firmly and sealing more thoroughly within the glass than the wires 46. The wires 46 may be of any suitable metal having the desired rigidity to serve as supporting means for the elements of the vacuum tube. The openings 45 are slightly larger than the wires 46 so that the same can be readily placed therein without binding. The diameters of the portion 65, of the member 64 and of the member 73 are such that there is sufficient space between the same for the wires 46, the openings 45 being so placed preferably that the wires 46 engage with the outer surface of the portion 65 of the glass tube 64.

Referring now to Fig. 2, my improved method of making a stem for a vacuum tube, or other glass vessel from which the air is exhausted, provided with an exhaust tube is practiced by mounting the parts substantially as shown in Fig. 8. The wires 46 are mounted with the ends thereof to which the wires 88 are secured extending a short distance between the tubes 73 and 64 and preferably in engagement with the widened portion 65 of the tube 64. The parts are then heated uniformly at the lower end of the member 73 and the widened portion 65 of the member 64, the zone in which the parts are heated embracing substantially the entire widened portion 65 of the member 64 and the portion of the member 73 opposite thereto. This heating is continued until the glass tubes in the heated zone thereof reach substantially a plastic state. In order to uniformly heat the parts 73 and 64, the same are preferably rotated with the flames 84 playing thereagainst as shown in Fig. 2, there being as many of said flames provided as is necessary to properly heat the tubes. The borated wires 88 and wires 46 are, of course, also heated to a certain extent, the borated copper clad wires then being in a condition to seal readily within the glass. As a result of the heating, there is a tendency for both the members 73 and 65 to reduce in diameter due to the fact that the weight of the glass tends to draw the same downward. The mandrel or core 48 is made slightly larger than the internal diameter of the member 65 and the member 65 will practically always be of smaller diameter than the core 48 after the same has been heated due to such reduction of the diameter of the same because of being heated. The core 48 is, however, provided with a tapered nose at 49 to spread the portion 65 outwardly and increase the diameter thereof as the core 48 is projected into the same.

After the members 73 and 65 have been heated to the proper extent, the mandrel or core 48 is inserted and the jaws or dies 33 are applied to the exterior thereof to thus compress the members 65 and 73 between the core 48 and the jaws 33 with the wires 46 therebetween. The portions of the members 73 and 65 engaged by the jaws 33 and by the core 48 being in a plastic state, the same will be united into an annular joint indicated by the numeral 89 which acts as an anchoring means for the wires 46, the borated copper clad wires 88 being fused in and sealed in the joint 89 so that the entire joint with the wires therein is air tight, the joint being of smaller external diameter than the original external diameter of the tube 73 due to the compressing action of the jaws 33 and being of larger internal diameter than the tubular portion 65 of the member 64 due to the expanding action of the core 48. Due to the shape of the jaws, an annular shoulder 90 is formed between the portion 89 and the tubular portion 73. The wires are arranged in an annular series, as will be evident from Fig. 4, before the compressing operation takes place and will be sealed in the annular portion 89 in such a series as shown in Fig. 4.

In Figs. 5 and 6, a slightly different form of apparatus for making the stem portion is shown. Certain parts thereof are the same as shown in Figs. 1 to 4 inclusive and these bear the same numerals. The principal difference between the form of the invention shown in Figs. 5 and 6 and that shown in the previously described form, is that the core or mandrel that is adapted to enter within the tubular member 64 at the enlarged end 65 thereof, is rotatable relative to the support 44 and accordingly, rotatable relative to the tubular member 64. This aids in shaping the portion 65 properly and preventing reduction in diameter of the same during the heating operation and also prevents the tubular member 64 from sticking to the core.

Referring to Fig. 5, it will be seen that the axially shiftable member 40' is of greater length than the member 40 extending outwardly at the lower end of the gear 22 and extending upwardly through the member 52' corresponding to the member 52 in Figs. 1 to 4 inclusive. Said member 40' passes through an enlarged opening 107 in the member 52' and may be made integral with the core 48'. A flange 108 is provided where the member 40' joins the member 48' and a coil compression spring 109 is mounted on the member 40' between the flange 108 and the washer 110 that engages with the upper side of the member 52'. The member 48' is made of substantially the same shape as the member 48, but instead of merely moving axially in the portion 44, it is rotatable relative thereto either by holding the same against rotation as the head rotates, or by rotating the same by any suitable means at a different rate than the rotation of the head. While the member 40' is adapted to be raised when the member 52' is raised as the jaws 33 move toward each other, the same is also adapted to be independently raised and rotated.

Any suitable means may be provided for this purpose, one form of such means being shown diagrammatically of Fig. 5, the member 40' being provided with a disk 111 mounted so as to rotate therewith with which the friction wheel 112 is adapted to engage, said friction wheel being mounted on a shaft 113 which is rotated by means of a shaft 114 with which it is connected by the universal joint 115, which shaft 114 is driven from the same source of power as the shaft 24 if desired. A sleeve 116 is provided on the shaft 113 and is adapted to be raised and lowered by the rod 117 which is connected with a pivoted yoke 118 on the sleeve 115, said rod 117 being operated by any suitable handle or pedal as desired.

It will be seen that when the friction wheel 112 is moved into engagement with the disk 111, rotation of the member 40' will result and as the same is lifted further, due to engagement of the wheel 112 therewith, the mandrel or core 48' will be projected into the tube 64, thus spreading the portion 65 to its proper diameter and shaping the same so that it will unite with the outer tubular member 73 when the jaws 33 are moved into compressing relation thereto, the member 48', of course, moving into the member 64 at the enlarged portion 65 thereof as the jaws 33 move toward compressing position, as in the previously described form. It is, however, desirable that the member 48' shall have completed its movement before the jaws 33 engage with the tubular member 73. The flange 108 enters a socket portion 119 in the member 28 and as the member 52' moves upwardly, the parts 40', 48' and 108 will move therewith as well as the spring 109. However, when the flange 108 engages with the wall 120 of the socket 119, the movement of the member 48' upwardly will be halted after which the spring 109 will be compressed as the jaws 33 move into engagement with the member 73 whereby the movement of the member 48' is completed before the jaws 33 reach their final compressing position. Fig. 6 shows the position of the jaws 33 when the flange member 108 engages with the wall 120. From the point shown in Fig. 6 in full lines on until the dotted position is reached, the jaws 33 move while the member 48' is stationary.

The shaft 21' extends upwardly from the member 22 in a similar manner to that in which the shaft 21 extends upwardly from the member 22 in the form shown in Figs. 1 to 4 inclusive, but is of greater length and is threaded at the end 122 thereof to receive the nuts 43', the end portion 122 being of reduced diameter to provide a shoulder 121 between which and the nut 43', the member 39 is clamped.

In operating the machine shown in Figs. 5 and 6, the member 48' is preferably projected into and rotated within the member 65 by operation of the operating rod 117, before the jaws 33 are closed, the member 48' being again carried upwardly but without rotation relative to the tubular member 64 and the supporting member 44 when the jaws 33 are moved toward their compressing position, the member 48' completing its movement before the jaws 33 engage with the member 73 as described above. While the member 48' is shown as being rotated by the engagement of the wheel 112 with the disk 111, obviously a similar result can be obtained by holding the member 48' from rotation and raising the same. As the member 44 and the members 73 and 64 are all rotating together, with the head of the machine, the holding of the member 48' from rotation and raising the same will produce the same result of shaping and spreading the tubular portion 65 when stationary as when the same is rotated at a different speed or in a different direction than the head, as all that is necessary is to have relative rotation of the member 48' to the tubular member 65. While it is not absolutely necessary to rotate the core and while there would not be any great reduction in diameter of the member 65 if the wires 46 are in engagement therewith, yet when these do not engage with the tubular portion 65, the member 48' is preferably rotatable to more efficiently shape the portion 65 and increase the diameter thereof while the same is in a plastic state.

Having thus described my invention what I desire to claim and secure by United States Letters Patent is:

1. In a machine of the character described, a support having wire receiving openings therein, a core projectable through said support, a pair of jaws movable toward and away from said core above said support, means for moving said jaws toward each other and means for projecting said core from said support and rotating the same relative to said support.

2. In a machine of the character described, a support having wire receiving openings therein, a core projectable through said support, a pair of jaws movable toward and away from said core above said support, means for moving said jaws toward each other and simultaneously projecting said core from said support and means for projecting said core from said support and rotating the same relative to said support.

3. In a machine of the character described, a support having wire receiving openings therein, a core projectable through said support, a pair of jaws movable toward and away from said core above said support, means for simultaneously moving said jaws toward each other and projecting said core from said support, and means for checking the projecting movement of said core before said jaws complete their movement toward each other.

In witness whereof, I hereunto subscribe my name this 10th day of October, A. D., 1927.

CLAUDE E. FITCH.